US010749417B2

(12) United States Patent
Oka et al.

(10) Patent No.: US 10,749,417 B2
(45) Date of Patent: Aug. 18, 2020

(54) STATOR, METHOD OF MANUFACTURING STATOR, AND APPARATUS FOR MANUFACTURING STATOR CORE MEMBER

(71) Applicant: HONDA MOTOR CO., LTD., Minato-ku, Tokyo (JP)

(72) Inventors: Keiichiro Oka, Tochigi-ken (JP); Kenji Masai, Tochigi-ken (JP)

(73) Assignee: HONDA MOTOR CO., LTD., Tokyo (JP)

(*) Notice: Subject to any disclaimer, the term of this patent is extended or adjusted under 35 U.S.C. 154(b) by 68 days.

(21) Appl. No.: 16/132,652

(22) Filed: Sep. 17, 2018

(65) Prior Publication Data

US 2019/0089230 A1   Mar. 21, 2019

(30) Foreign Application Priority Data

Sep. 20, 2017   (JP) .................. 2017-180628

(51) Int. Cl.
*H02K 15/02* (2006.01)
*H02K 1/18* (2006.01)
*H02K 15/12* (2006.01)
*H02K 15/04* (2006.01)

(52) U.S. Cl.
CPC ............ *H02K 15/028* (2013.01); *H02K 1/18* (2013.01); *H02K 15/12* (2013.01); *H02K 15/0421* (2013.01)

(58) Field of Classification Search
CPC ........ H02K 15/028; H02K 1/18; H02K 15/12; H02K 15/0421

USPC .................. 310/213, 113, 216.114
See application file for complete search history.

(56) References Cited

U.S. PATENT DOCUMENTS

| | | | | |
|---|---|---|---|---|
| 7,866,027 | B2* | 1/2011 | Hashimoto | H02K 15/028 29/596 |
| 8,754,565 | B2* | 6/2014 | Feroleto | H02K 1/16 310/216.114 |
| 2013/0187486 | A1* | 7/2013 | Lee | H02K 5/02 310/43 |
| 2015/0084478 | A1* | 3/2015 | Yamashita | H02K 5/00 310/216.114 |
| 2016/0308407 | A1* | 10/2016 | Mahler | H02K 1/165 |

(Continued)

FOREIGN PATENT DOCUMENTS

JP     03-074155     7/1991
JP     2012-165484   8/2012

OTHER PUBLICATIONS

Japanese Office Action for Japanese Patent Application No. 2017-180628 dated Jun. 25, 2019.

*Primary Examiner* — Jeremy A Luks
(74) *Attorney, Agent, or Firm* — Amin, Turocy & Watson, LLP

(57) ABSTRACT

A stator core constituting a stator at least includes first core members and a second core member. Each first core member includes a first annular portion in which slots are formed and first tab portions. On the other hand, the second core member includes a second annular portion in which the slots are formed and that is superposed on the first annular portions, and has a shape obtained by removing the first tab portions from the first core member. Electrical conductors are partially fitted in the overlapping slots.

9 Claims, 11 Drawing Sheets

(56) References Cited

U.S. PATENT DOCUMENTS

2017/0271965 A1* 9/2017 Uda ................... H02K 15/12
2019/0202175 A1* 7/2019 Nishikawa ............ H02K 1/185

* cited by examiner

FIG. 8
(1st) 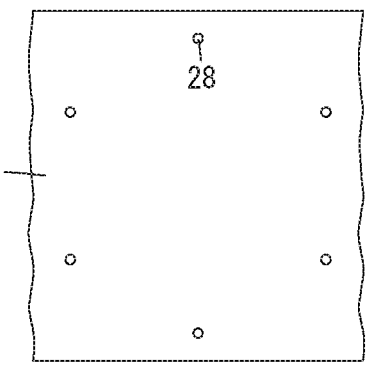
(2nd) 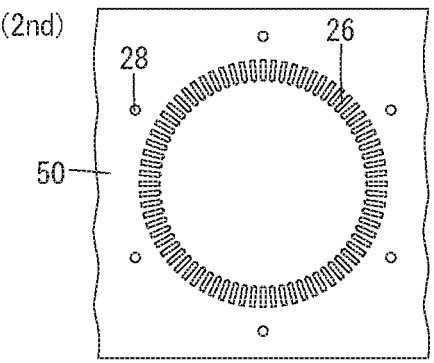
(3rd) 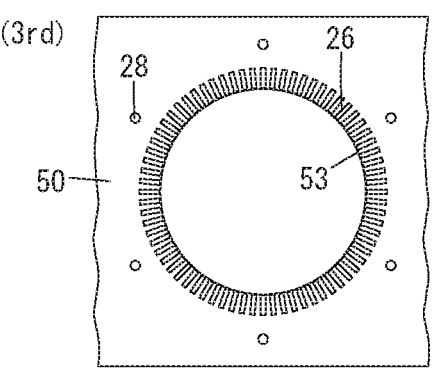
(4th) (NO MACHINING)
(5th) (NO MACHINING)
(6th) (NO MACHINING)
(7th) 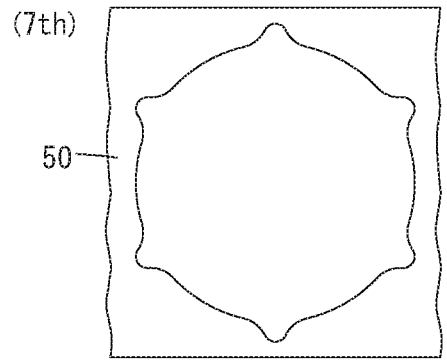
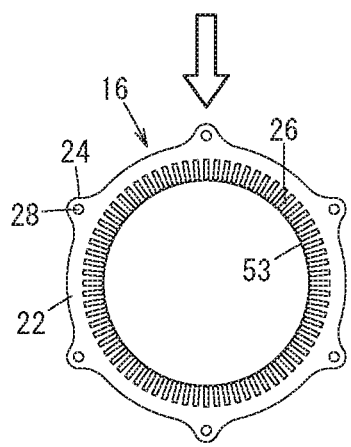

FIG. 9
(1st)
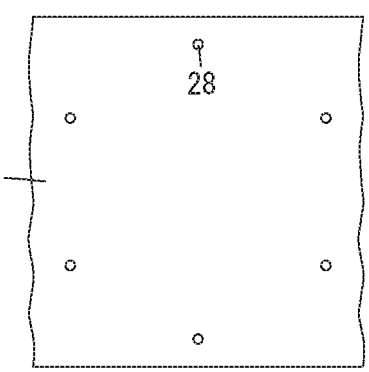
(2nd)
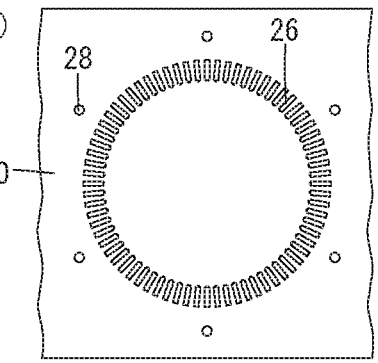
(3rd)
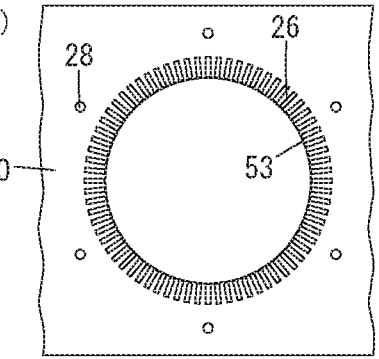
(4th)
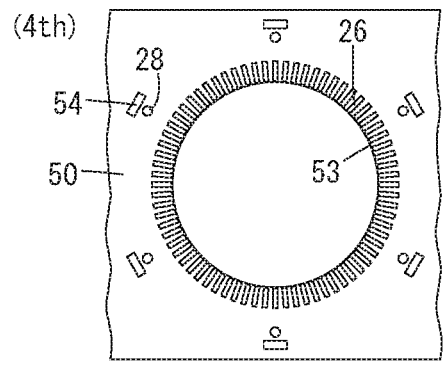
(5th)
(NO MACHINING)
(6th)
(NO MACHINING)
(7th)
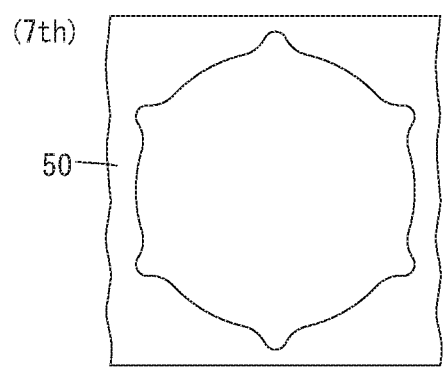
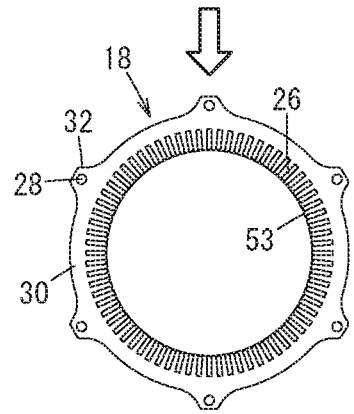

FIG. 10
(1st)
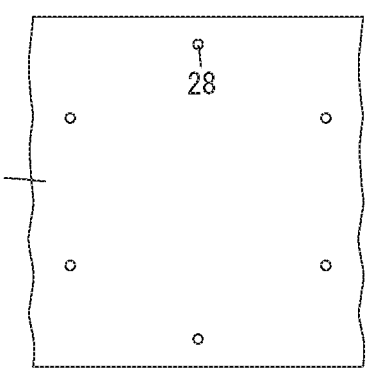
(2nd)
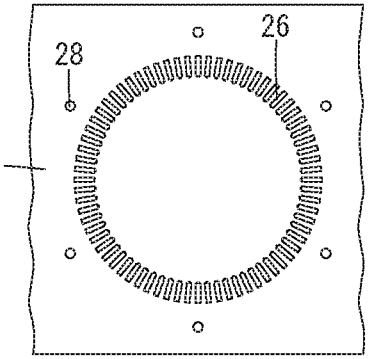
(3rd)
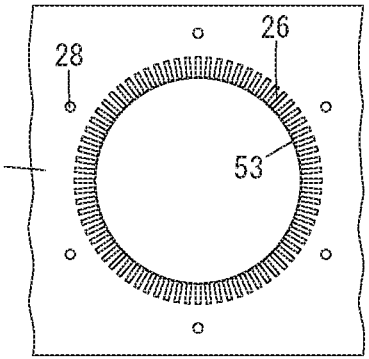
(4th) (NO MACHINING)
(5th)
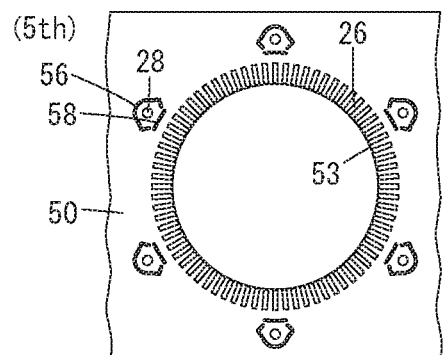
(6th)
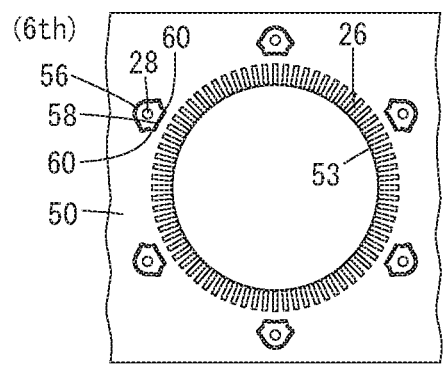
(7th)
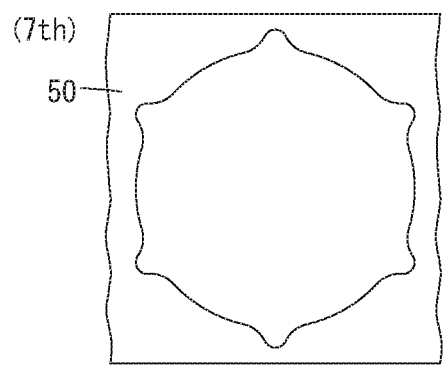
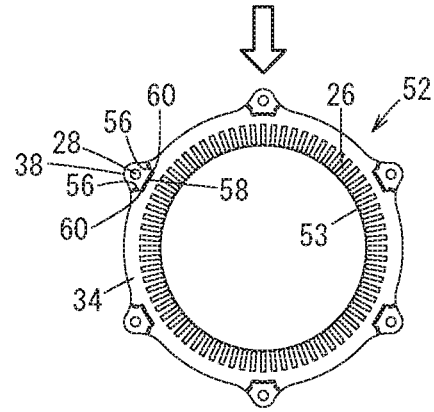

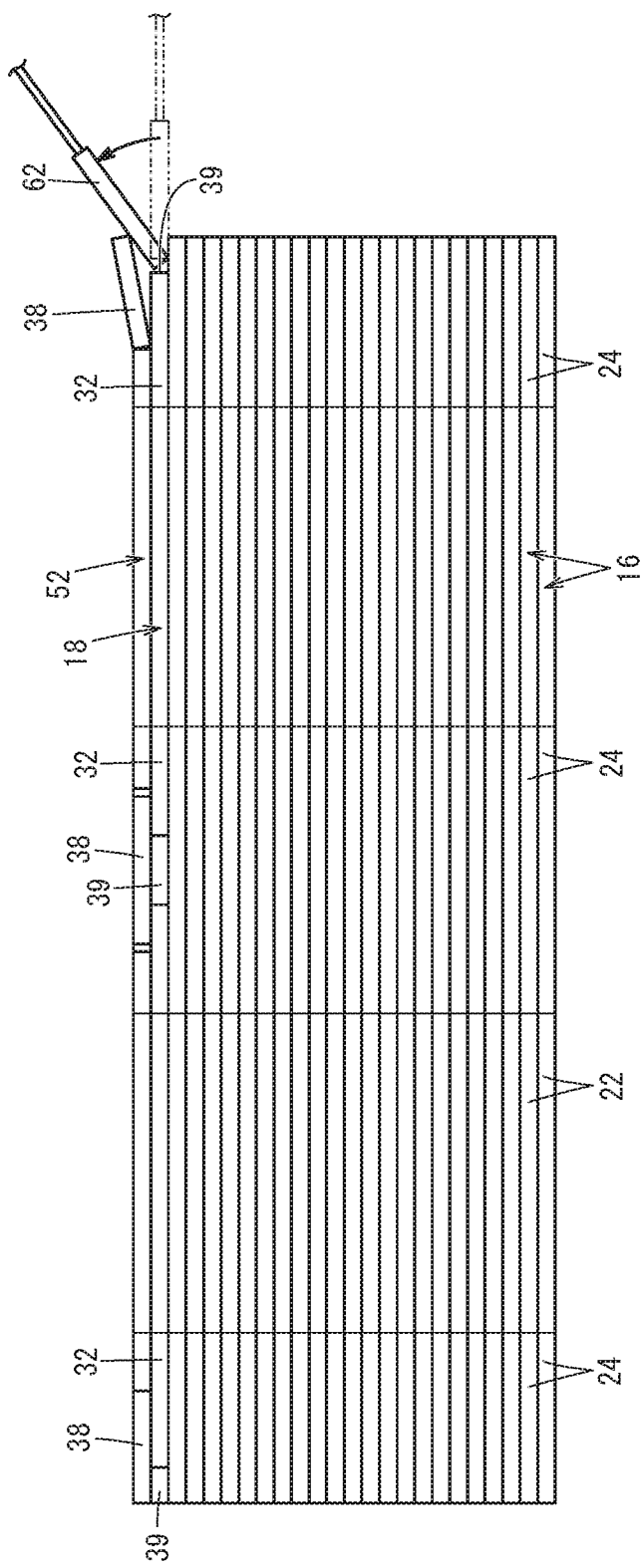

STATOR, METHOD OF MANUFACTURING STATOR, AND APPARATUS FOR MANUFACTURING STATOR CORE MEMBER

CROSS-REFERENCE TO RELATED APPLICATION

This application is based upon and claims the benefit of priority from Japanese Patent Application No. 2017-180628 filed on Sep. 20, 2017, the contents of which are incorporated herein by reference.

BACKGROUND OF THE INVENTION

Field of the Invention

The present invention relates to stators constituting electric rotary machines such as motors and power generators together with rotatable rotors, methods of manufacturing stators, and apparatuses for manufacturing stator core members.

Description of the Related Art

Known electric rotary machines such as motors and power generators each include a positioned stator and a rotor rotatable inside or outside the stator. As an example configuration, a stator includes a substantially annular stator core. The stator core is formed by laminating core plates with fastener holes and connecting the core plates with each other by caulking, welding, or other methods. The stator core is fixed to a casing or the like using bolts fitted in the fastener holes.

The stator core has a plurality of slots formed along the circumferential direction of the stator core. Each slot receives a leg of a substantially U-shaped electrical conductor (hereinafter also referred to as "segment") composed of two legs and a curved portion. The legs exposed from the slot are joined together to be electrically connected. In this manner, the stator is constructed.

As described in Japanese Laid-Open Patent Publication No. 2012-165484, the exposed portions of the electrical conductors such as joining portions of the legs are coated with insulating resin to insulate the exposed portions.

In a case where insulating resin such as resin powder or varnish is scattered around and adheres to the vicinity of the fastener holes of the uppermost core plate during application of the insulating resin, washers are prevented from coming into close contact with the attachment surface of the stator or the fastening surface of the core plate. This may lead to a reduction in fastening force. To avoid this, for example, an operator needs to visually check the state in the vicinity of the fastener holes or cover the vicinity of the fastener holes with masking tape or the like in advance for easy removal of the scattered insulating resin and then peel off the masking tape after the application of the insulating resin to remove the scattered insulating resin.

SUMMARY OF THE INVENTION

In a case where masking tape is used, a process of sticking the masking tape in the vicinity of the fastener holes and a process of removing the masking tape after the application of the insulating resin are required. In addition, although the masking tape is very expensive due to its high heat-resistance to maintain the performance under the environment where the insulating resin is applied, the masking tape cannot be reused with consideration of reliability, resulting in difficulty in reducing the cost.

A principal object of the present invention is to provide a stator allowing insulating resin scattered around fastener holes of a core plate to be removed easily.

Another object of the present invention is to provide a method of manufacturing the above-described stator.

Yet another object of the present invention is to provide an apparatus for manufacturing stator core members to produce members constituting the above-described stator.

According to an embodiment of the present invention, a stator includes:

a stator core formed by laminating a plurality of first core members and at least one second core member; and electrical conductors partially fitted in slots formed in the stator core;

wherein the first core members each include a first annular portion in which the slots are formed and a first tab portion in which a fastener hole for fitting a fastening member is formed and that protrudes from an outer circumference of the first annular portion; and the second core member includes a second annular portion in which the slots are formed and that is superposed on the first annular portions, and has a shape from which a portion corresponding to the first tab portions of the first core members has been removed.

According to another embodiment of the present invention, a method of manufacturing a stator including a stator core formed by laminating a plurality of first core members and at least one second core member, and electrical conductors partially fitted in slots formed in the stator core, includes:

a first core member production step of producing the plurality of first core members each including a first annular portion in which the slots are formed and a first tab portion in which a fastener hole for fitting a fastening member is formed and that protrudes from an outer circumference of the first annular portion;

a preform production step of producing at least one second core member preform including a second annular portion in which the slots are formed and that is superposed on the first annular portions and a removal target portion in which a fastener hole for fitting the fastening member is formed and that is superposed on the first tab portions;

a lamination step of laminating the first core members and the second core member preform;

a coating step of coating part of the electrical conductors protruding from the slots with resin after the electrical conductors are partially fitted in the overlapping slots of the first core members and the second core member preform; and a removal step of removing the removal target portion from the second core member preform to form the second core member.

In this manner, in the present invention, the removal target portion is formed in the second core member preform, which is disposed at an upper position in the stator core, and is removed from the second core member preform after the application of insulating resin. In the coating step, part of the insulating resin may be scattered over the removal target portion. However, removal of the removal target portion after the coating step exposes the clean first tab portion (or a second tab portion described below) to which insulating resin has not adhered. This eliminates the concern about the possibility of insulating resin being trapped when the core members are connected with each other by fitting the fastening member in the fastener hole. Thus, a stator exhibiting a sufficient fastening force over the long term is obtained.

In addition, no masking tape, which is expensive, is required, resulting in reduction in the cost. Furthermore, since no processes such as sticking and removing masking tape are required, no special tools for these processes are required.

At least one third core member may be interposed between the first core members and the second core member. The third core member includes a third annular portion in which the slots are formed and that is interposed between the first annular portions and the second annular portion, and a second tab portion in which a fastener hole for fitting the fastening member is formed, that protrudes from an outer circumference of the third annular portion, and that is superposed on the first tab portions. The second tab portion has a shape obtained by removing protruding ends of the first tab portions.

In this configuration, the protruding end of the second tab portion is located inward from the protruding ends of the first tab portions in a diameter direction of the stator core. Thus, when the second tab portion is interposed between the first tab portion and the removal target portion, the protruding end is located inward from the protruding ends of the first tab portion and the removal target portion. This forms a socket in the stator core. The removal target portion is easily separated from the second annular portion by, for example, fitting a tool in the socket and then inclining or rotating the tool.

The third core member may be produced from the first core member including the first annular portion and the first tab portion by removing the protruding end of the first tab portion to form the second tab portion. In this case, the third core member can be formed into a shape substantially identical to the shape of the first core members and thus is easily produced.

Moreover, the second core member preform may be produced from the first core member including the first annular portion and the first tab portion by forming a weakened portion around the first tab portion to form the removal target portion. In this case, the second core member preform can be formed into a shape substantially identical to the shape of the first core members and thus is easily produced.

In addition, the second core member preform and the third core member may be formed by adding a partial switching mechanism to the dies for forming the first core member. This reduces capital investment cost.

The above-described first core members, the second core member preform, and the third core member may be produced by, for example, punching and blanking in an identical belt-like strip while the strip is being advanced.

According to yet another embodiment of the present invention, an apparatus for manufacturing stator core members including a first core member and a second core member laminated to constitute a stator core, includes:

a fastener hole forming die for forming a fastener hole in a workpiece, the faster hole allowing passage of a fastening member;

a slot forming die for forming slots in the workpiece, the slots receiving part of electrical conductors;

a circular shape punching die for punching out a circular opening in an inner area of the slots;

a weakened portion forming die for forming a weakened portion by partially punching the workpiece; and a core blanking die for blanking out of the workpiece the first core member or a second core member preform to be the second core member;

wherein punching and blanking using the fastener hole forming die, the slot forming die, and the core blanking die produce the first core member including a first annular portion in which the slots are formed and a first tab portion in which the fastener hole is formed; and punching and blanking using the fastener hole forming die, the slot forming die, the weakened portion forming die, and the core blanking die produce the second core member preform including a second annular portion in which the slots are formed and a removal target portion in which the weakened portion is formed around the fastener hole and that protrudes from an outer circumference of the second annular portion.

In this manner, in the present invention, an identical apparatus may be used to produce the first core member and the second core member preform. In addition, the apparatus may be constructed by adding the weakened portion forming die for forming the weakened portion to the existing apparatus for forming the first core member. Thus, it is not necessary to separately prepare an apparatus for producing the first core member and an apparatus for producing the second core member preform. This results in reduction in capital investment.

The identical apparatus may also be used to produce the first core member, the second core member preform, and a third core member. In this case, a linear shape punching die for punching out a linear opening radially outward from the fastener hole may be added. More specifically, punching and blanking in the workpiece using the fastener hole forming die, the slot forming die, the linear shape punching die, and the core blanking die may produce the third core member including a third annular portion in which the slots are formed and a second tab portion in which the fastener hole is formed and that has a shape obtained by removing a protruding end of the first tab portion.

According to the present invention, at least the first core member and the second core member preform constitute the stator core, and the second core member preform includes the removal target portion. The removal target portion is removed from the second core member preform located at an upper position in the stator core, in particular, after insulating resin is applied to the electrical conductors.

In the coating step, the insulating resin may be scattered over the removal target portion. However, removal of the removal target portion after the coating step exposes the clean first tab portion (or the second tab portion of the third core member) to which insulating resin has not adhered. This eliminates the concern about the possibility of insulating resin adhering to the removal target portion being trapped when the core members are connected with each other by fitting the fastening member in the fastener hole. Thus, a stator exhibiting a sufficient fastening force is obtained.

Consequently, no masking tape is required, and thus no masking tape is thrown away after one use. Furthermore, since no processes such as sticking and removing masking tape are required, no special tools for these processes are required. For these reasons, the cost of producing the stator can be reduced.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 8 is a schematic flow diagram illustrating a process of forming the main core plate (first core member) illustrated in FIG. 4;

FIG. 9 is a schematic flow diagram illustrating a process of forming the socket forming core plate (third core member) illustrated in FIG. 5;

FIG. 10 is a schematic flow diagram illustrating a process of forming a preform of the protective core plate (second core member) illustrated in FIG. 6; and FIG. 11 is a schematic side view illustrating a state where a tool is fitted in a socket formed in the stator core.

DESCRIPTION OF THE PREFERRED EMBODIMENTS

Preferred embodiments of a stator and a method of manufacturing the stator according to the present invention will be described in detail below with reference to the accompanying drawings, in relation to an apparatus for manufacturing stator core members.

Figure 1:
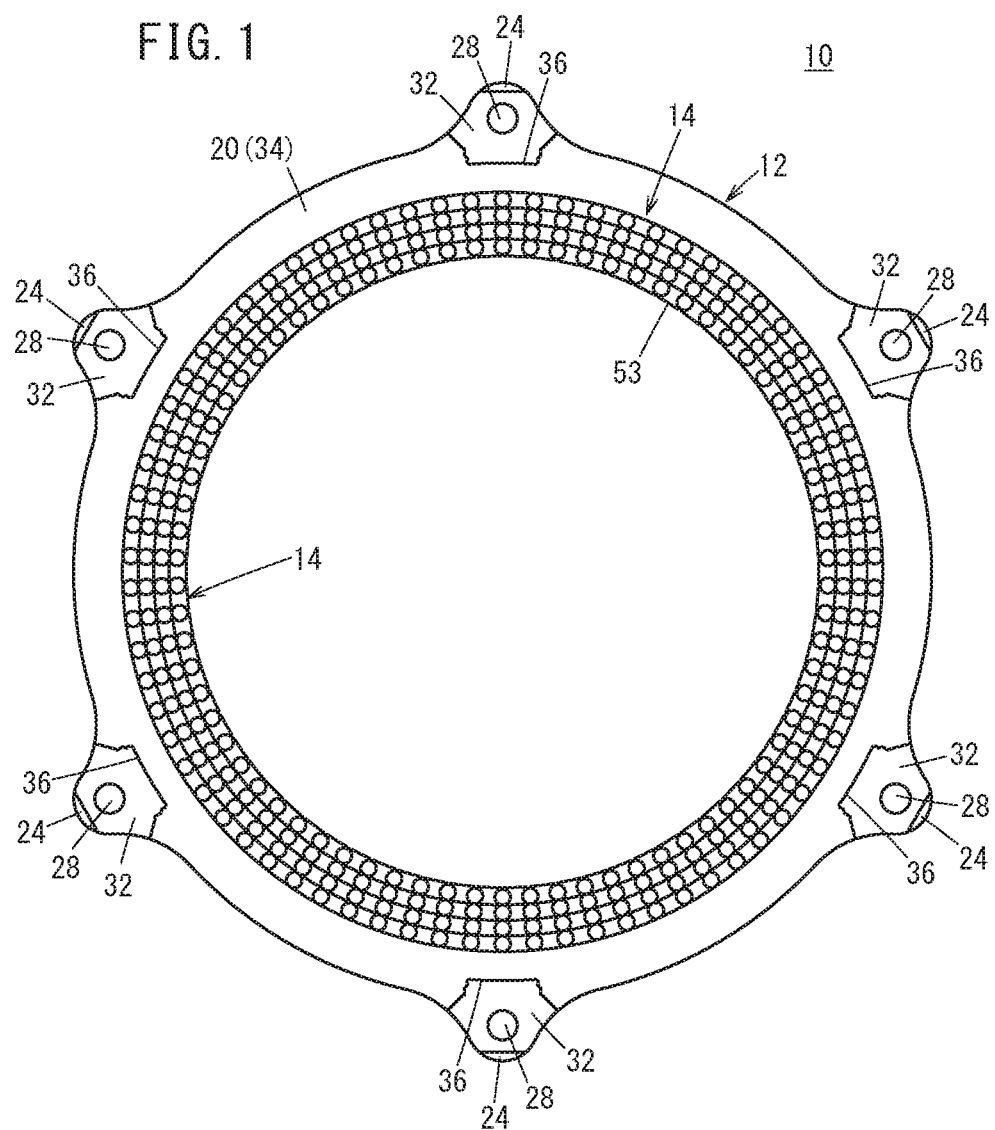
FIG. 1 is a schematic plan view of a stator from which illustration of insulating resin is omitted.
Figure 2:
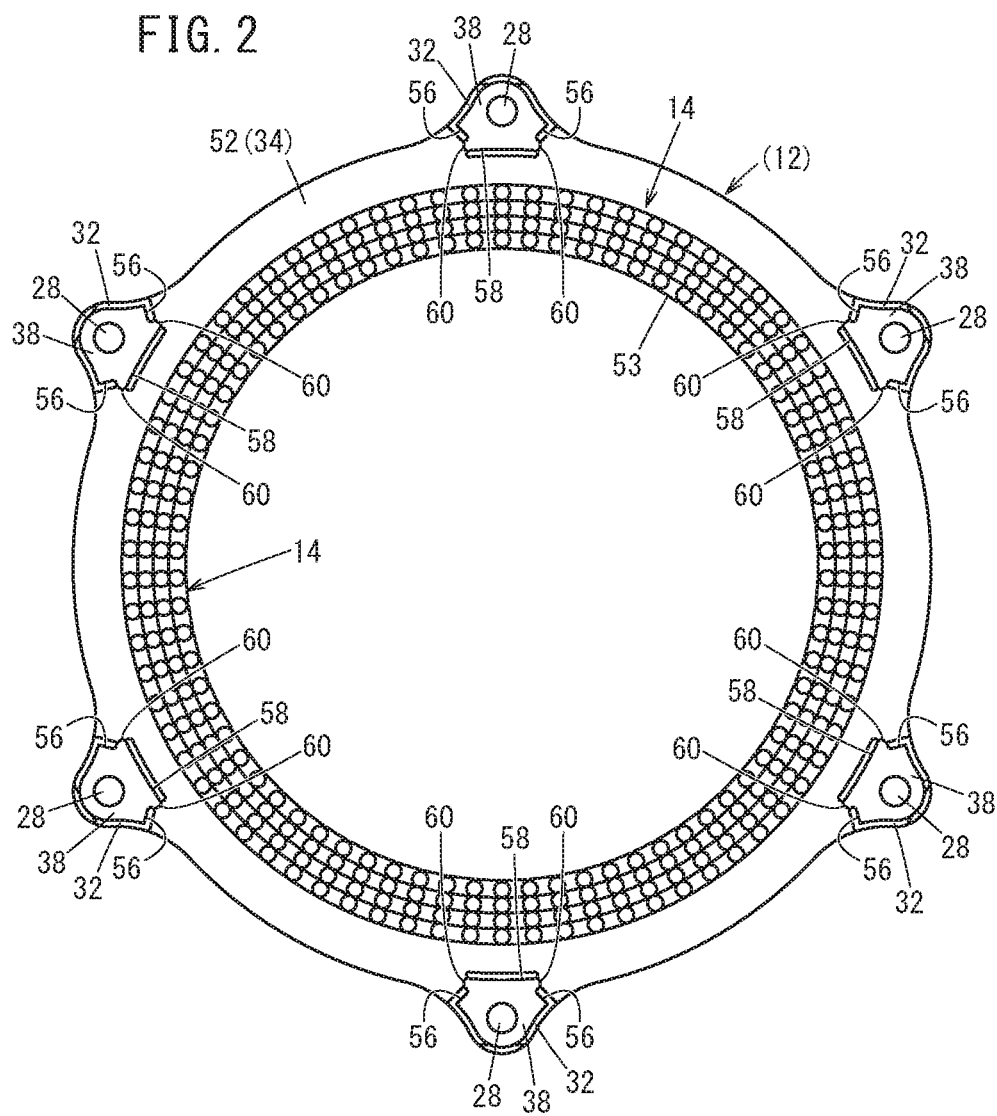
FIG. 2 is a schematic plan view of the stator before removal target portions of a protective core plate (second core member) are removed.
Figure 3:
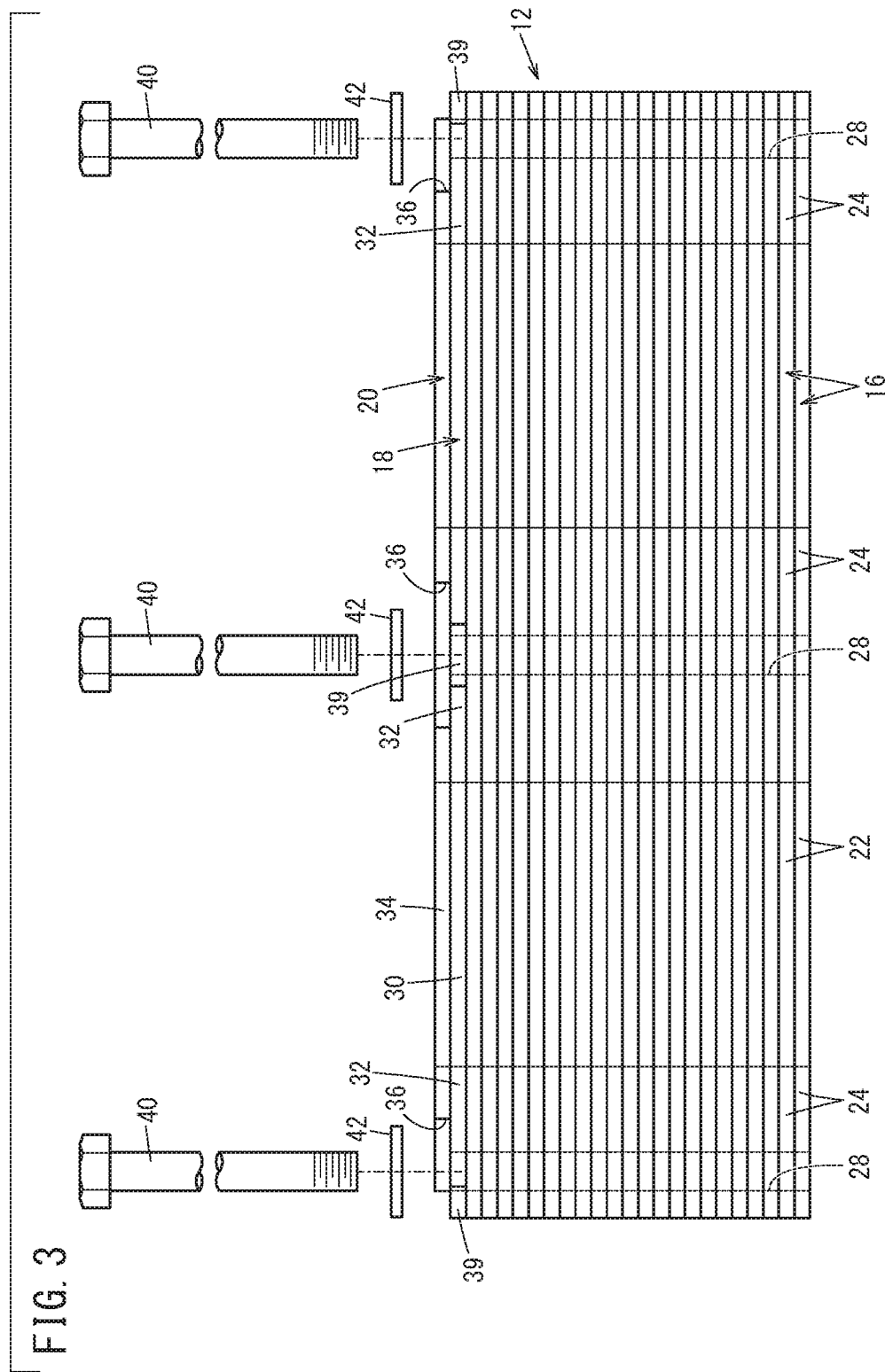
FIG. 3 is a schematic side view of a stator core constituting the stator illustrated in FIG. 1.

FIG. 1 is a schematic plan view of a stator 10 from which illustration of insulating resin is omitted. FIG. 2 is a schematic plan view of the stator 10 before removal target portions 38 (described later) are removed. The stator 10 includes a stator core 12 and segments (electrical conductors) 14. FIG. 3 is a schematic side view of the stator core 12.

Figure 4:
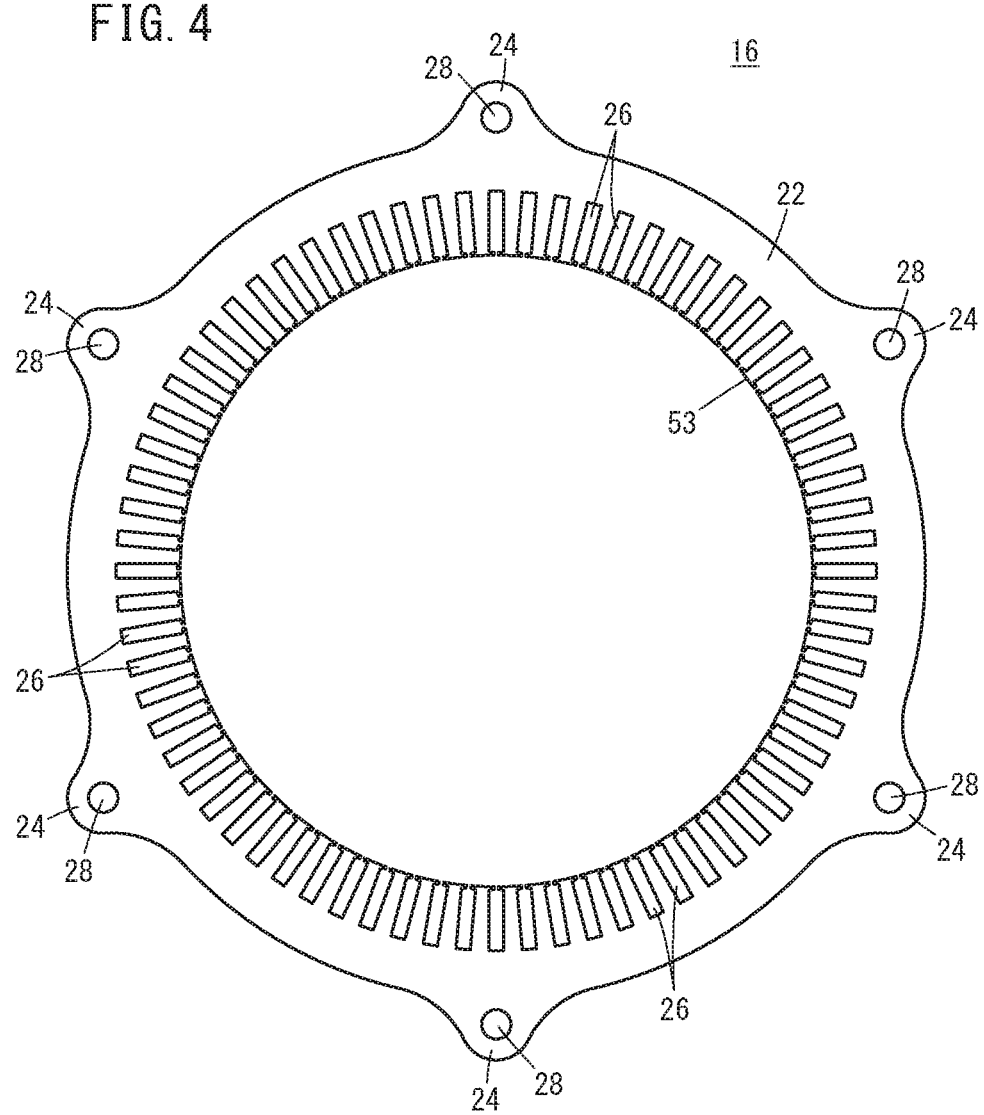
FIG. 4 is a schematic plan view of a main core plate (first core member) constituting the stator illustrated in FIG. 1.
Figure 5:
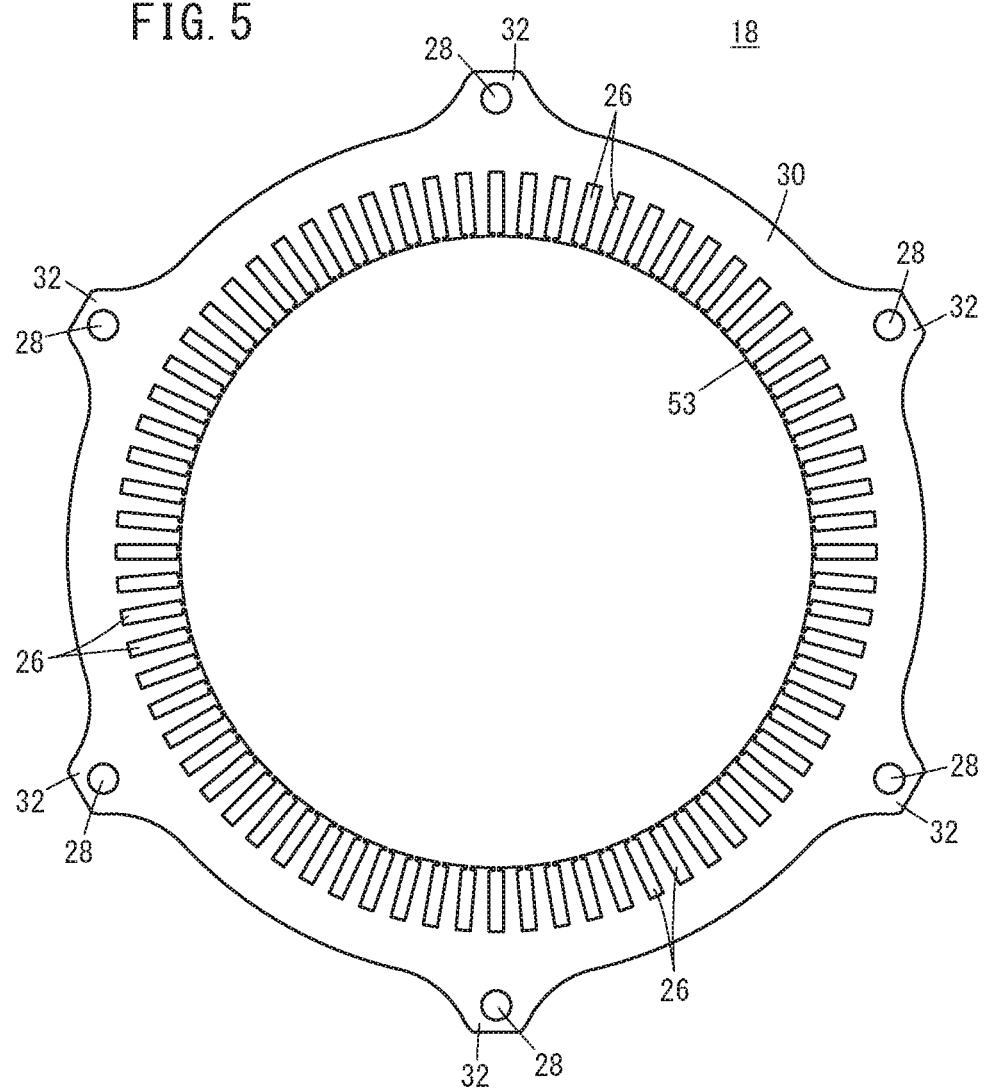
FIG. 5 is a schematic plan view of a socket forming core plate (third core member) constituting the stator illustrated in FIG. 1.
Figure 6:
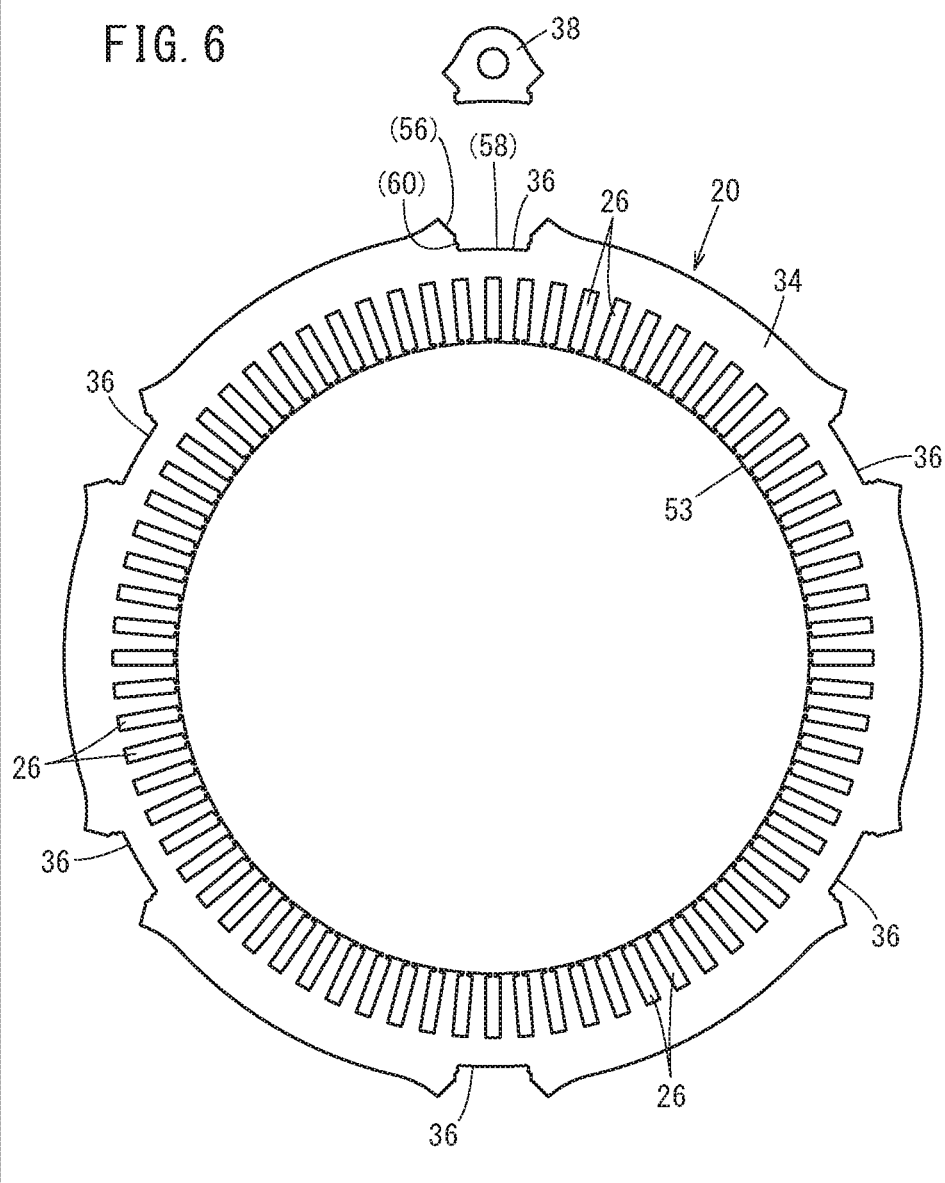
FIG. 6 is a schematic plan view of a protective core plate (second core member) constituting the stator illustrated in FIG. 1.

First, the stator core 12 will be described. The stator core 12 is a laminate including three kinds of core plates illustrated in FIGS. 4 to 6 stacked on top of each other. Hereinafter, the core plates illustrated in FIGS. 4, 5, and 6 respectively refer to a main core plate (first core member) 16, a socket forming core plate (third core member) 18, and a protective core plate (second core member) 20.

The main core plate 16 includes a first annular portion 22 and first tab portions 24 protruding from the outer circumference of the first annular portion 22. A plurality of slots 26 are formed adjacent to the inner circumference of the first annular portion 22 along the first annular portion 22. The longitudinal directions of the slots 26 correspond to diameter directions of the first annular portion 22, and thus the slots 26 extend radially.

The plurality of (six in this embodiment) first tab portions 24 are separated at regular intervals. Each of the first tab portions 24 has a shape approximating to an isosceles triangle including a portion of the outer circumference of the first annular portion 22 as a base with the largest length. The first tab portions 24 each include a curved protruding end and a fastener hole 28 formed substantially in the center of the first tab portion 24.

The socket forming core plate 18 includes an interposed annular portion (third annular portion) 30 and second tab portions 32 protruding from the outer circumference of the interposed annular portion 30. The inner diameter and the outer diameter of the interposed annular portion 30 substantially correspond to the inner diameter and the outer diameter, respectively, of the first annular portion 22. The interposed annular portion 30 is superposed on the first annular portion 22. As a matter of course, slots 26, overlapping with the slots 26 of the main core plate 16, are formed in the interposed annular portion 30.

The second tab portions 32 are formed such that the phases of the second tab portions 32 correspond to the phases of the six first tab portions 24. The second tab portions 32 have a shape obtained by removing the protruding ends of the first tab portions 24. More specifically, the second tab portions 32 have a substantially trapezoidal shape obtained by cutting off the curved tops of the first tab portions 24. The second tab portions 32 each have the fastener hole 28 formed substantially in the center of the second tab portion 32.

The protective core plate 20 includes a second annular portion 34 overlapping with the first annular portion 22 via the interposed annular portion 30. The inner diameter and the outer diameter of the second annular portion 34 substantially correspond to the inner diameters and the outer diameters, respectively, of the first annular portion 22 and the interposed annular portion 30. Moreover, slots 26 ranging with the slots 26 formed in the first annular portion 22 and the interposed annular portion 30 are formed adjacent to the inner circumference of the second annular portion 34 to make a round along the second annular portion 34.

The protective core plate 20 does not include portions corresponding to the first tab portions 24 and the second tab portions 32. More specifically, the protective core plate 20 has a shape obtained by removing the first tab portions 24 from the first annular portion 22 (or the second tab portions 32 from the interposed annular portion 30) and parts of the outer circumference of the first annular portion 22 extending from the first tab portions 24. Thus, the second annular portion 34 has hollow portions 36 recessed inward from the outer circumference. As will be described later, the hollow portions 36 are marks left after the removal target portions 38 have been removed.

The stator core 12 is composed of the main core plate 16, the socket forming core plate 18, and the protective core plate 20 configured as above and stacked in this order from the bottom. Note that the stator core 12 includes a plurality of (for example, ten or more to tens of) main core plates 16. On the other hand, the stator core 12 requires at least one and at most a few socket forming core plates 18 and protective core plates 20.

The second tab portions 32 are superposed on the first tab portions 24, and the hollow portions 36 are located above the second tab portions 32. As the second tab portions 32 have a shape obtained by removing the protruding ends of the first tab portions 24, the protruding ends of the second tab portions 32 are located inward from the protruding ends of the first tab portions 24 in the diameter directions of the stator core 12. This forms sockets 39 (described later) in the stator core 12.

Moreover, at least one second tab portion 32 is placed on a plurality of first tab portions 24, and thus the fastener holes 28 are aligned with each other. Bolts 40 serving as fastening members are fitted in the fastener holes 28. The bolts 40 are screwed into bolt holes formed in a member such as a casing (not illustrated), so as to join the main core plates 16 and the socket forming core plate 18 and position and fix the core plates inside the member such as the casing. Washers 42 are interposed between the top surfaces (fastening surfaces) of the second tab portions 32 around the fastener holes 28 and the bottom surfaces of the heads of the bolts 40. Reference numeral 53 denotes inner holes that form the first annular portion 22, the interposed annular portion 30, and the second annular portion 34 into the annular shapes.

Figure 7:
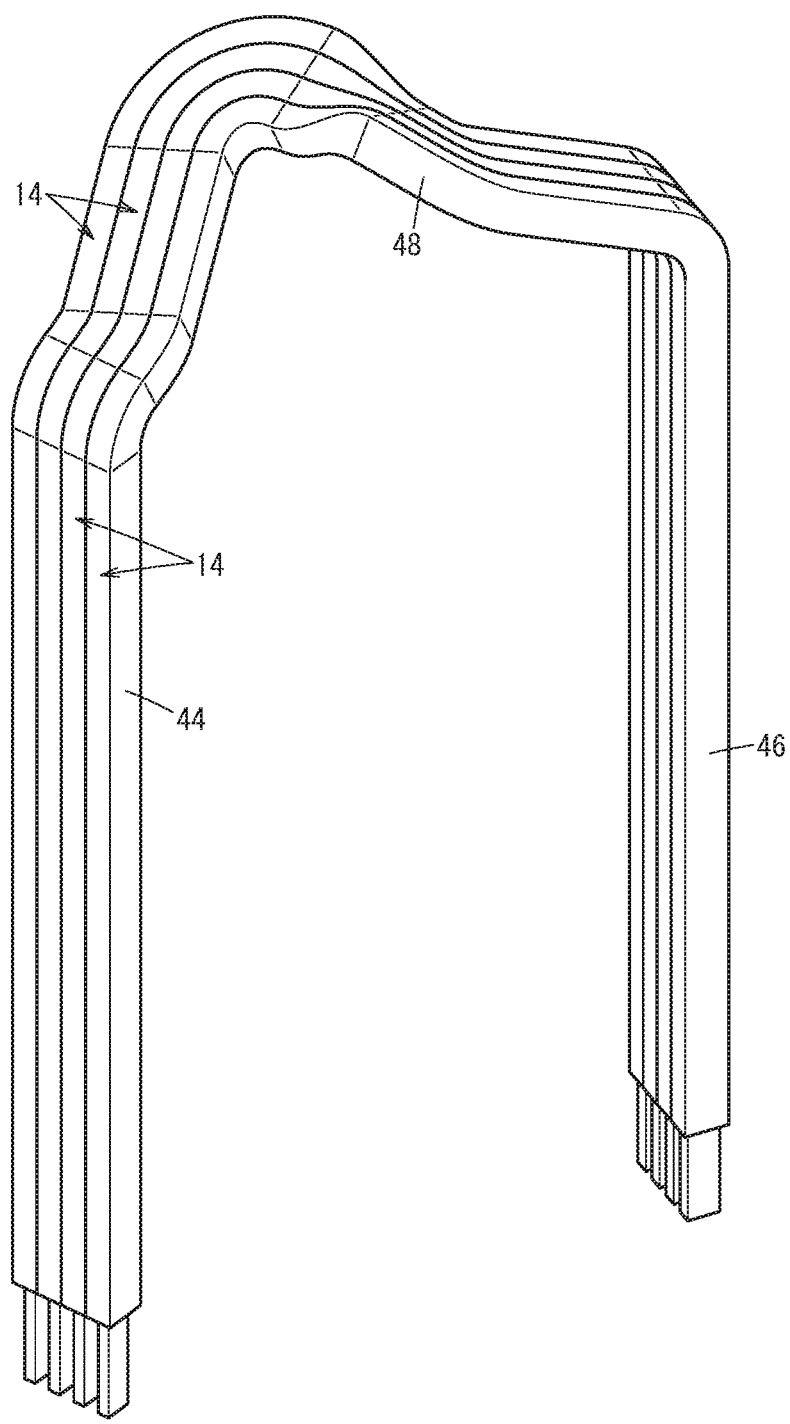
FIG. 7 is a schematic perspective view illustrating a state where a plurality of segments (electrical conductors) constituting the stator illustrated in FIG. 1 are bundled.

Next, as illustrated in FIG. 7, the segments 14 each include a first leg 44, a second leg 46 extending parallel to the first leg 44, and a turning portion 48 lying between the first leg 44 and the second leg 46. The turning portion 48 bends to be turned back from the first leg 44 to the second leg 46, and thus the segment 14 has a substantially U-shape.

The first leg 44 of each segment 14 is fitted in one of the slots 26 formed in the stator core 12 while the second leg 46 is fitted in another. As a result, the segment 14 serves as an electrical path between the two slots 26. More specifically, the slot 26 in which the first leg 44 is fitted and the slot 26 in which the second leg 46 is fitted can be electrically connected with each other. As illustrated in FIG. 7, a plurality of (four in FIG. 7) segments 14 are bundled, and the first legs 44 and the second legs 46 are fitted in respective identical slots 26. The first legs 44 of the four segments 14 and the second legs 46 of another four segments 14 are fitted in one slot 26, and, as a result, eight legs in total are disposed in the slot 26.

The first legs 44 and the second legs 46 are then joined appropriately to the first legs 44 or the second legs 46 of the other segments 14. The segments 14 are electrically connected with each other in this manner to form electromagnetic coils. The turning portions 48 and the like of the segments 14 exposed from the slots 26 are then covered with insulating resin (not illustrated).

Although the protective core plate 20 does not have the fastener holes 28 into which the bolts 40 are fitted, the segments 14 are partially fitted in the slots 26 as above and, in addition, the segments 14 are fixed by the insulating resin while being positioned. Furthermore, the plurality of main core plates 16 are connected with each other, the uppermost main core plate 16 and the socket forming core plate 18 are connected with each other, and the socket forming core plate 18 and the protective core plate 20 are connected with each other, by caulking, welding, or other methods. This prevents the protective core plate 20 from being displaced or dropping off from the socket forming core plate 18.

Next, a method of manufacturing the stator 10 will be described in relation to an apparatus for manufacturing the stator core members. Hereinafter, the apparatus for manufacturing the stator core members is simply referred to as a core manufacturing apparatus.

The core manufacturing apparatus according to this embodiment includes first to seventh shaping stations illustrated in FIGS. 8 to 10. In FIGS. 8 to 10, the first shaping station, the second shaping station, the third shaping station, the fourth shaping station, the fifth shaping station, the sixth shaping station, and the seventh shaping station are respectively indicated by "1st", "2nd", "3rd", "4th", "5th", "6th", and "7th".

A single, long strip 50 (belt-like strip) serving as a workpiece passes from the first to seventh shaping stations. The main core plate 16, the socket forming core plate 18, and a protective core plate preform 52 (hereinafter simply referred to as "preform") are blanked out of the strip 50.

In more detail, as is clear from FIGS. 8 to 10, the first shaping station includes a fastener hole forming punch (die) for punching the fastener holes 28. The second shaping station includes a slot forming punch (die) for punching the slots 26. The third shaping station includes a circular shape punch (die) for punching a circular opening in the inner area of the slots 26.

The fourth shaping station includes a linear shape punch (die) for punching linear openings 54 at positions radially outward from the fastener holes 28. The fifth shaping station includes a slit forming punch (weakened portion forming die) for forming first slits 56 and second slits 58 serving as weakened portions around the fastener holes 28. The sixth shaping station includes a tear line forming punch (weakened portion forming die) for forming tear lines 60 between the first slits 56 and the second slits 58. The seventh shaping station includes a core blanking punch (die) for blanking the main core plate 16, the preform 52, or the protective core plate 20.

Punching and blanking as above in an identical area of the strip 50 at the first, second, third, and seventh shaping stations yield the main core plate 16. In more detail, as illustrated in FIG. 8, the fastener hole forming punch descends to an area of the strip 50 located at the first shaping station. This descent forms the six fastener holes 28 at the same time.

Next, the strip 50 is advanced, causing the area with the fastener holes 28 to be located at the second shaping station. The slot forming punch then descends to punch the slots 26.

The area with the fastener holes 28 and the slots 26 is then advanced to the third shaping station. At the third shaping station, the circular shape punch punches a circular opening in the inner area of the slots 26 to form the inner hole 53.

The area with the fastener holes 28, the slots 26, and the circular inner hole 53 punched in the inner area of the slots 26 is then advanced to the fourth, fifth, and sixth shaping stations in sequence. No machining is performed at these shaping stations to produce the main core plate 16. More specifically, the linear shape punch, the slit forming punch, and the tear line forming punch do not descend. Thus, the linear openings 54, the first slits 56, the second slits 58, the tear lines 60, and the like are not formed around the fastener holes 28.

Finally, at the seventh shaping station, the core blanking punch blanks out the area with the fastener holes 28, the slots 26, and the circular opening punched in the inner area of the slots 26, such that the vicinities of the fastener holes 28 form the first tab portions 24 and the area with the slots 26 forms the first annular portion 22. This yields the main core plate 16 including the first annular portion 22 with the slots 26 and the first tab portions 24 with the fastener holes 28 protruding from the outer circumference of the first annular portion 22.

At the moment when the area in which the fastener holes 28 are formed at the first shaping station is advanced to the second shaping station, an area downstream of the area with the fastener holes 28 is advanced and positioned at the first shaping station. As illustrated in FIG. 9, punching and blanking in the downstream area at the first, second, third, fourth, and seventh shaping stations yield the socket forming core plate 18 (third core member production step).

More specifically, as in the case of the production of the main core plate 16, the six fastener holes 28, the slots 26, and the circular inner hole 53 punched in the inner area of the slots 26 are respectively formed by the fastener hole forming punch, the slot forming punch, and the circular shape punch at the first, second, and third shaping stations in sequence.

Next, the strip 50 is advanced, causing the area with the fastener holes 28, the slots 26, and the inner hole 53 to be located at the fourth shaping station. The linear shape punch then descends to punch linear openings radially outward from the fastener holes 28. More specifically, the linear openings 54 are formed.

The area is advanced to the fifth and sixth shaping stations in sequence. As in the case of the production of the main core plate 16, no machining is performed at these shaping stations to produce the socket forming core plate 18. More specifically, the first slits 56, the second slits 58, the tear lines 60, and the like are not formed around the fastener holes 28.

Finally, at the seventh shaping station, the core blanking punch blanks out the area with the fastener holes 28, the slots 26, the circular opening punched in the inner area of the slots 26, and the linear openings 54 formed radially outward from the fastener holes 28, such that the vicinities of the fastener holes 28 form the second tab portions 32 and the area with the slots 26 forms the interposed annular portion 30. This yields the socket forming core plate 18 including the interposed annular portion 30 with the slots 26 and the second tab portions 32 with the fastener holes 28 protruding from the outer circumference of the interposed annular portion 30.

As the linear openings 54 are formed in advance, the second tab portions 32 have a substantially trapezoidal shape obtained by cutting off the protruding ends of the first tab portions 24. Consequently, the socket forming core plate 18 includes the interposed annular portion 30 formed in a manner similar to the first annular portion 22 and the second tab portions 32 having a shape obtained by partially altering the shape of the first tab portions 24.

At the moment when the area with the fastener holes 28 and the slots 26, which is to be the main core plate 16, is advanced to the third shaping station and the area with the fastener holes 28, which is to be the socket forming core plate 18, is advanced to the second shaping station, an area downstream of the latter area is advanced and positioned at the first shaping station. As illustrated in FIG. 10, punching and blanking in the downstream area at the first, second, third, fifth, sixth, and seventh shaping stations yield the preform 52 to be the protective core plate 20.

More specifically, as in the cases of the production of the main core plate 16 and the socket forming core plate 18, the six fastener holes 28, the slots 26, and the circular inner hole 53 punched in the inner area of the slots 26 are respectively formed by the fastener hole forming punch, the slot forming punch, and the circular shape punch at the first, second, and third shaping stations in sequence.

Next, the strip 50 is advanced, causing the area with the fastener holes 28, the slots 26, and the inner hole 53 to be located at the fourth shaping station. No machining is performed at the fourth shaping station to produce the preform 52. More specifically, the linear openings 54 are not formed radially outward from the fastener holes 28. Thus, the area to be the preform 52 located at the fourth shaping station has a shape similar to the shape of the area to be the main core plate 16.

The area is advanced to the fifth and sixth shaping stations in sequence. At the fifth shaping station, the slit forming punch descends to form the first slits 56 and the second slits 58 around the fastener holes 28. The first slits 56 extend along the outlines of the first tab portions 24 and extend to cut in the outer circumference of the second annular portion 34. On the other hand, the second slits 58 linearly extend in the second annular portion 34 adjacent to the base ends of the first tab portions 24. The second slits 58 are slightly longer than the linear openings 54.

At the sixth shaping station, the tear line forming punch descends to form the tear lines 60 between the first slits 56 and the second slits 58. The tear lines 60 weaken the portions between the first slits 56 and the second slits 58. More specifically, the first slits 56, the tear lines 60, and the second slits 58 weaken the first tab portions 24 to create the removal target portions 38 that are easily removable from the second annular portion.

Subsequently, at the seventh shaping station, the core blanking punch blanks out the area with the fastener holes 28, the slots 26, the circular opening punched in the inner area of the slots 26, and the first slits 56, the tear lines 60, and the second slits 58 surrounding the fastener holes 28 such that the vicinities of the fastener holes 28 form the removal target portions 38 and that the area with the slots 26 forms the second annular portion 34. As illustrated in FIG. 10, this yields the preform 52 including the second annular portion 34 with the slots 26 and the removal target portions 38 with the fastener holes 28 protruding from the outer circumference of the second annular portion 34.

In this manner, according to this embodiment, the apparatus for blanking out the main core plate 16 can also be used to blank out the socket forming core plate 18 and the preform 52 (protective core plate 20). Moreover, a few more punchings in some parts of the main core plate 16 yield both the socket forming core plate 18 and the preform 52. That is, no complicated dies or apparatuses are required. This results in reduction in capital investment.

As a matter of course, the preform 52 can be produced prior to the socket forming core plate 18 after the production of the main core plate 16. Furthermore, the numbers of the main core plates 16, the socket forming core plates 18, and the preforms 52 to be formed do not need to be the same. For example, after (or before) ten or more to tens of the main core plates 16 are produced, one to a few socket forming core plates 18 and preforms 52, which are of sufficient numbers, may be produced. The numbers of the socket forming core plates 18 and the preforms 52 to be produced do not need to be the same either.

Next, the main core plate 16, the socket forming core plate 18, and the preform 52 produced as above are laminated. The number of the main core plates 16 may be, for example, ten or more to tens, and the numbers of the socket forming core plates 18 and the preforms 52 may be, for example, one to a few. The numbers of the socket forming core plates 18 and the preforms 52 do not need to be the same, and may be set individually.

During laminating, the interposed annular portion 30 (third annular portion) is superposed on the uppermost first annular portion 22, and the second annular portion 34 is superposed on the interposed annular portion 30. At the same time, the second tab portions 32 are superposed on the uppermost first tab portions 24, and the removal target portions 38 are superposed on the second tab portions 32 as illustrated in FIGS. 2 and 11. As the second tab portions 32 have a substantially trapezoidal shape obtained by removing the protruding ends of the first tab portions 24, the protruding ends of the second tab portions 32 are located inward from the protruding ends of the first tab portions 24 in the diameter directions of the stator core 12. This forms the sockets 39 recessed inward in the diameter directions in the stator core 12.

Next, the bolts 40 are fitted into the fastener holes 28 in the main core plates 16, the socket forming core plate 18, and the protective core plate 20 (preform 52), and the ends exposed from the fastener holes 28 are screwed into nuts. In this manner, the stator core 12 is temporarily assembled. The first legs 44 and the second legs 46 of the segments 14 are fitted into the slots 26 of the temporary core assembly obtained as above from, for example, the bottom of the stator core 12. The first legs 44 and the second legs 46 are fitted in different slots 26.

The first legs 44 and the second legs 46 are exposed from the slots 26 of the protective core plate 20. The exposed first legs 44 and second legs 46 are twisted in the circumferential direction using a predetermined device to join the ends of the first legs 44 and the second legs 46 together. This causes the segments 14 to be electrically connected with each other and yields a temporary assembly of the stator 10.

Next, the temporary core assembly is, for example, electrically heated, and then the exposed portions of the segments 14 are coated with resin powder. The resin powder melts by the heat and flows to cover the portions of the segments 14 exposed from the slots 26. The insulating resin then hardens, thereby constituting the stator 10 including the segments 14 insulated from the outside.

When the insulating resin is applied as above, the resin powder may be scattered around and adhere to the vicinity of the fastener holes 28 of the protective core plate 20 located at the uppermost position in the stator core 12. Following this, the bolts 40 are removed from the stator 10, and the stator 10 is assembled to a casing or the like constituting a motor. If the resin powder adheres to the vicinity of the fastener holes 28, the washers 42 are prevented from coming into close contact with the vicinity of the fastener holes 28.

To avoid this, the removal target portions 38 of the protective core plate 20 are removed in this embodiment. To do this, as illustrated in FIG. 11, a sharp tool 62 (for example, the end of a flathead screwdriver) is fitted into each of the sockets 39 of the stator core 12 formed by the second tab portions 32 of the socket forming core plate 18. Lifting the tool 62 after the insertion causes a crack having a rupture starting point at the second slit 58 in the removal target portion 38. The crack propagates to the first slit 56 via the tear lines 60, and, as a result, the removal target portion 38 of the preform 52 is removed from the second annular portion 34. This yields the protective core plate 20 having the hollow portions 36 at the locations of the removal and causes the temporary assembly of the stator 10 to be the stator 10 including the second tab portions 32 that are visible when viewed in plan.

Since the removal target portions 38 to which foreign substances such as resin powder adhere are removed as above, the clean second tab portions 32 are located above the first tab portions 24 in the stator core 12. More specifically, the removal target portions 38 cover the second tab portions 32 and the first tab portions 24 to function as a protective portion preventing resin powder from adhering to the tab portions 24, 32.

When the stator 10 is attached to the casing or the like, new bolts 40 (fastening members) are fitted from the fastener holes 28 of the second tab portions 32 into the fastener holes 28 of the first tab portions 24 while the washers 42 are interposed between the heads of the bolts 40 and the top surfaces of the second tab portions 32. The bolts 40 are screwed into the bolt holes in the casing.

In the process of applying resin powder to the segments 14, the second tab portions 32 are interposed between the first tab portions 24 and the removal target portions 38. This prevents the scattered resin powder from adhering to the second tab portions 32. Thus, when the bolts 40 are fitted into the fastener holes 28 of the second tab portions 32 as above, foreign substances such as resin powder or varnish are prevented from being trapped between the top surfaces of the second tab portions 32 and the washers 42 or between the washers 42 and the heads of the bolts 40, resulting in sufficient fastening force.

In addition, no masking tape, which is expensive, is required in this case, and thus no masking tape is thrown away after one use. Moreover, since no processes such as sticking and removing masking tape are required, no special tools for these processes are required. For these reasons, the cost can be reduced.

As described above, the core plates adjacent to each other are connected by caulking, welding, or other methods. Furthermore, the protective core plate 20 is connected to the socket forming core plate 18 and the main core plates 16 by the segments 14 fitted into the slots 26. This prevents the protective core plate 20 from being displaced or dropping off from the stator core 12.

In a case where the attachment surface of the stator 10 is also coated with resin powder or varnish, one to a few preforms 52 (protective core plates 20), one to a few socket forming core plates 18, ten or more to tens of main core plates 16, one to a few socket forming core plates 18, and one to a few preforms 52 (protective core plates 20) may be laminated in this order from the bottom. Also in this case, removing the upper and lower removal target portions 38 as above yields the stator core 12 including the clean second tab portions 32 exposed at the upper and lower parts of the stator core 12.

The present invention is not limited in particular to the above-described embodiment, and various modifications can be made thereto without departing from the scope of the present invention as set forth in the appended claims.

For example, the position of the shaping station at which the linear openings 54 are formed may be interchanged with the position of the shaping station at which the first slits 56 and the second slits 58 are formed or the position of the shaping station at which the tear lines 60 are formed.

Furthermore, the weakened portions do not necessarily need to be the first slits 56 or the second slits 58, and may be any structures such as multiple round holes causing the removal target portions 38 to be easily removable from the second annular portion 34.

Yet moreover, the socket forming core plate 18 does not necessarily need to be interposed between a main core plate 16 and a protective core plate 20, in other words, the sockets 39 do not necessarily need to be formed in the stator core 12 in a case where the removal target portions 38 can be removed easily from the second annular portion 34. In this case, the stator core 12 may be composed of the main core plates 16 and the protective core plate 20.

What is claimed is:
1. A stator comprising:
a stator core formed by laminating a plurality of first core members and at least one second core member; and
electrical conductors partially fitted in slots formed in the stator core;

wherein the first core members each include a first annular portion in which the slots are formed and a first tab portion in which a fastener hole for fitting a fastening member is formed and that protrudes from an outer circumference of the first annular portion;

the second core member includes a second annular portion in which the slots are formed and that is superposed on the first annular portions, and has a shape from which a portion corresponding to the first tab portions of the first core members has been removed;

at least one third core member interposed between the first core members and the second core member;

wherein the third core member includes a third annular portion in which the slots are formed and that is interposed between the first annular portions and the second annular portion, and a second tab portion in which a fastener hole for fitting the fastening member is formed, that protrudes from an outer circumference of the third annular portion, and that is superposed on the first tab portions; and the second tab portion has a shape obtained by removing a protruding end of the first tab portion.

2. A method of manufacturing a stator including a stator core formed by laminating a plurality of first core members and at least one second core member, and electrical conductors partially fitted in slots formed in the stator core, comprising:

a first core member production step of producing the plurality of first core members each including a first annular portion in which the slots are formed and a first tab portion in which a fastener hole for fitting a fastening member is formed and that protrudes from an outer circumference of the first annular portion;

a preform production step of producing at least one second core member preform including a second annular portion in which the slots are formed and that is superposed on the first annular portions and a removal target portion in which a fastener hole for fitting the fastening member is formed and that is superposed on the first tab portions;

a lamination step of laminating the first core members and the second core member preform;

a coating step of coating part of the electrical conductors protruding from the slots with resin after the electrical conductors are partially fitted in the overlapping slots of the first core members and the second core member preform; and a removal step of removing the removal target portion from the second core member preform to form the second core member.

3. The method of manufacturing the stator according to claim 2, further comprising a third core member production step of producing a third core member including a third annular portion that is interposed between the first annular portions and the second annular portion, and a second tab portion that has a shape obtained by removing a protruding end of the first tab portion and that is interposed between the first tab portions and the removal target portion.

4. The method of manufacturing the stator according to claim 3, wherein the third core member is produced from the first core member including the first annular portion and the first tab portion by removing the protruding end of the first tab portion to form the second tab portion.

5. The method of manufacturing the stator according to claim 3, wherein, in the removal step, the removal target portion is removed using a tool fitted into a gap defined by the first tab portions, the removal target portion, and the second tab portion.

6. The method of manufacturing the stator according to claim 3, wherein the first core members, the second core member preform, and the third core member are produced by punching and blanking in an identical belt-like strip.

7. The method of manufacturing the stator according to claim 2, wherein the second core member preform is produced from the first core member including the first annular portion and the first tab portion by forming a weakened portion around the first tab portion to form the removal target portion.

8. An apparatus for manufacturing stator core members including a first core member and a second core member laminated to constitute a stator core, comprising:

a fastener hole forming die for forming a fastener hole in a workpiece, the faster hole allowing passage of a fastening member;

a slot forming die for forming slots in the workpiece, the slots receiving part of electrical conductors;

a circular shape punching die for punching out a circular opening in an inner area of the slots;

a weakened portion forming die for forming a weakened portion by partially punching the workpiece; and a core blanking die for blanking out of the workpiece the first core member or a second core member preform to be the second core member;

wherein punching and blanking using the fastener hole forming die, the slot forming die, and the core blanking die produce the first core member including a first annular portion in which the slots are formed and a first tab portion in which the fastener hole is formed; and punching and blanking using the fastener hole forming die, the slot forming die, the weakened portion forming die, and the core blanking die produce the second core member preform including a second annular portion in which the slots are formed and a removal target portion in which the weakened portion is formed around the fastener hole and that protrudes from an outer circumference of the second annular portion.

9. The apparatus for manufacturing the stator core members according to claim 8, further comprising:

a linear shape punching die for punching out a linear opening radially outward from the fastener hole;

wherein punching and blanking in the workpiece using the fastener hole forming die, the slot forming die, the linear shape punching die, and the core blanking die produce a third core member including a third annular portion in which the slots are formed and a second tab portion in which the fastener hole is formed and that has a shape obtained by removing a protruding end of the first tab portion.

* * * * *